United States Patent
Papandreou et al.

(10) Patent No.: US 12,222,800 B2
(45) Date of Patent: Feb. 11, 2025

(54) WRITE AND RETIRE PAGES IN QLC NAND BLOCKS

(71) Applicant: International Business Machines Corporation, Armonk, NY (US)

(72) Inventors: Nikolaos Papandreou, Thalwil (CH); Timothy J. Fisher, Cypress, TX (US); Roman Alexander Pletka, Uster (CH); Charalampos Pozidis, Thalwil (CH); Radu Ioan Stoica, Zurich (CH); Aaron Daniel Fry, Richmond, TX (US); Andrew D. Walls, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 22 days.

(21) Appl. No.: 18/348,416

(22) Filed: Jul. 7, 2023

(65) Prior Publication Data
US 2024/0296085 A1    Sep. 5, 2024

(30) Foreign Application Priority Data
Mar. 2, 2023 (GR) .............................. 20230100177

(51) Int. Cl.
  *G06F 11/00* (2006.01)
  *G06F 11/07* (2006.01)

(52) U.S. Cl.
  CPC .......... *G06F 11/076* (2013.01); *G06F 11/073* (2013.01)

(58) Field of Classification Search
  CPC .............................. G06F 11/073; G06F 11/076
  See application file for complete search history.

(56) References Cited

U.S. PATENT DOCUMENTS

| | | |
|---|---|---|
| 9,208,018 B1 | 12/2015 | Northcott |
| 10,430,108 B2 | 10/2019 | Natarajan |
| 10,937,512 B2 | 3/2021 | Papandreou |
| 11,204,833 B1* | 12/2021 | Rozen ............. G06F 11/076 |
| 11,205,473 B2 | 12/2021 | Inbar |
| 2017/0115900 A1 | 4/2017 | Camp |
| 2019/0102102 A1* | 4/2019 | Natarajan ......... G06F 3/0613 |
| 2019/0354478 A1* | 11/2019 | Kashyap ........... G06F 11/1072 |

(Continued)

OTHER PUBLICATIONS

Disclosed Anonymously, "A Method and System for Prolonging Life of a Flash Memory by Swapping Rapidly Aging Blocks with Reserve Blocks", An IP.com Prior Art Database Technical Disclosure, IP.com No. IPCOM000235554D, IP.com Electronic Publication Date: Mar. 8, 2014, 3 pages.

(Continued)

*Primary Examiner* — Joshua P Lottich
(74) *Attorney, Agent, or Firm* — Joseph P. Curcuru

(57) ABSTRACT

A technique for writing data to pages in a QLC block of a QLC NAND flash memory device, where the device comprises a plurality of SLC pages organized in SLC blocks and a plurality of QLC pages organized in QLC blocks. The technique comprises storing received data in SLC pages, dividing equally a QLC block in a predefined number of sub-blocks according to a corresponding QLC page health status of the pages of the QLC block. Upon determining that SLC pages are to be copied from SLC pages to QLC pages, copying device-internal the respective SLC pages to the sub-blocks of the QLC block using device-internal cache registers, where the copying is based on an error-count aware scheme.

20 Claims, 7 Drawing Sheets

(56) References Cited

U.S. PATENT DOCUMENTS

| | | | | |
|---|---|---|---|---|
| 2019/0361614 A1* | 11/2019 | Natarajan | ............ | G06F 3/0679 |
| 2020/0042244 A1* | 2/2020 | Yang | ................ | G06F 3/0689 |
| 2020/0393972 A1* | 12/2020 | Tomic | ................ | G06F 3/0616 |
| 2021/0133070 A1* | 5/2021 | Pletka | ................ | G06F 12/0246 |
| 2021/0405886 A1* | 12/2021 | Inbar | ................ | G06F 3/0653 |
| 2022/0199164 A1* | 6/2022 | Kim | ................ | G11C 16/0433 |
| 2022/0413762 A1* | 12/2022 | Pletka | ................ | G06F 12/0844 |
| 2023/0297470 A1* | 9/2023 | Kaynak | ............ | G06F 11/1048 |
| | | | | 714/755 |
| 2023/0393736 A1* | 12/2023 | Rayaprolu | ........... | G06F 3/0638 |
| 2023/0418475 A1* | 12/2023 | Shukla | ................ | G06F 3/0608 |
| 2024/0054046 A1* | 2/2024 | Khayat | ................ | G11C 29/42 |
| 2024/0069806 A1* | 2/2024 | Bolisetty | ............ | G06F 3/0659 |
| 2024/0071515 A1* | 2/2024 | Lu | ................ | G11C 16/16 |
| 2024/0168683 A1* | 5/2024 | Li | ................ | G06F 3/0688 |
| 2024/0185924 A1* | 6/2024 | Lien | ................ | G11C 11/5628 |
| 2024/0185931 A1* | 6/2024 | Lien | ................ | G11C 16/3404 |
| 2024/0185934 A1* | 6/2024 | Lien | ................ | G11C 16/08 |
| 2024/0220359 A1* | 7/2024 | Inbar | ................ | G06F 11/076 |
| 2024/0221838 A1* | 7/2024 | Guo | ................ | G11C 11/5628 |
| 2024/0289040 A1* | 8/2024 | Athreya | ............ | G06F 3/064 |

OTHER PUBLICATIONS

Zhao et al., "Adaptive one-way SLC/TLC mode conversion in high density SSDs", IEICE Electronics Express, vol. 18, No. 19, pp. 1-6.

* cited by examiner

WRITE AND RETIRE PAGES IN QLC NAND BLOCKS

BACKGROUND

The invention relates generally to a method for writing data to pages in a QLC (quadruple-level cells) NAND flash memory device, and more specifically, to a computer-implemented method for writing data to pages in a QLC block of a QLC NAND flash memory device, where the device comprises a plurality of SLC pages organized in SLC blocks and a plurality of QLC pages organized in QLC blocks. The invention relates further to a dynamic data adapter generator system for writing data to pages in a QLC block of a QLC NAND flash memory device, where the device comprises a plurality of SLC pages organized in SLC blocks and a plurality of QLC pages organized in QLC blocks, and a related computer program product.

The ever-increasing amount of data to be stored in enterprise data centers drive the need for effective, reliable and energy-efficient persistent storage devices. Another requirement for enterprise data storage devices is low data access latency as well as low power consumption. One way to address these requirements is in using solid state drives (SSDs) instead of traditional hard disk drives (HDDs). It is well understood that the performance characteristics of these two alternatives are fundamentally different. NAND flash-based SSDs guarantee typically one order of magnitude faster write operations and lower latency due to the higher parallelism of read and write operations inside the storage device.

Conventional SSDs used to be based on single-level memory cells (SLC) NAND flash. These use storage cells based on floating gate transistors or charge trapping storage cells connected in series. Newer developments enable storing of more than 1 bit per cell. Multi-level cells (MLC) allow 2 bits per cell, triple-level cells (TLC) allow 3 bits per cell and finally quadruple-level cells (QLC) allow 4 bits per cell to be stored.

In NAND flash, the organization of the memory array in a memory chip can be expressed as a hierarchal structure. At a high level, a memory chip contains one or more physical structures to which data for a system can be stored. These structures are often referred to herein as "blocks". Each block comprises a set of "pages", e.g., 2048 pages. Each of these pages correspond to a group of memory cells connected by the same word-line (WL), and each word-line contains as many pages as the number of bits stored in the memory cells. For example, in QLC NAND flash, a memory cell can store up to 4 bits of information and thus each WL in a block comprises four pages. Each of these pages contain the bits of the same significance (e.g., the digit in a four digit binary number, such as 0001) from all the cells in the corresponding WL. Further, all pages in a block that carry the bits of the same significance in the various word-lines of the block are said to be of the same page "type".

For example, "b3b2b1b0" may denote the 4 bits stored in each cell of a particular QLC NAND flash chip. In this example, the page type that contains the least-significant bits "b0" from all the cells of a particular word-line may be referred to as the "lower page type." Further, the page type that contains the bits "b1" may be referred to as the "upper page type." The page type that contains the bits "b2" may be referred to as the "extra page type," and the page type that contains the most-significant bits "b3" may be referred to as the "top page type." As noted, these page-type names are examples. The names of the page types may vary based on the design of the chip and may also differ between memory chip manufacturers.

Data is written to a flash block by writing the pages of the block sequentially following a device specific program order. On the other hand, the data is erased from the block at once from all the pages.

These days, a combination of SLC and QLC blocks is not unusual. It should also be mentioned that QLC blocks may be operated in SLC mode. The combination of SLCs and QLCs may address the need of a fast access to the data—provided by SLCs—and a high memory device density—provided by QLCs.

However, one downside of flash memory cells is its limited active lifetime. It turns out that with the memory usage the memory cells wear, so, over time, pages cannot be used any due to high number of errors beyond the error correction capability of the used error correction code (ECC).

Consequently, a sophisticated memory management of a flash memory controller external to the NAND flash memory devices may be required. Here, all address mapping and replacement strategies may be controlled.

SUMMARY OF THE INVENTION

According to one aspect of the present invention, a computer-implemented method for writing data to pages in a QLC block of a QLC NAND flash memory device, where the device may comprise a plurality of SLC pages organized in SLC blocks and a plurality of QLC pages organized in QLC blocks may be provided. The method may comprise storing received data in SLC pages, dividing equally a QLC block in a predefined number of sub-blocks according to a corresponding QLC page health status of the pages of the QLC block, and upon determining that SLC pages are to be copied from SLC pages to QLC pages, the method may comprise copying device-internal the respective SLC pages to the sub-blocks of the QLC block using device-internal cache registers. Thereby, the copying may be based on an error-count aware scheme.

According to another aspect of the present invention, a dynamic data adapter generator system for writing data to pages in a QLC block of a QLC NAND flash memory device, where the device may comprise a plurality of SLC pages organized in SLC blocks and a plurality of QLC pages organized in QLC blocks may be provided. The system may comprise a one or more processors and a memory operatively coupled to the one or more processors, wherein the memory stores program code portions which, when executed by the one or more processors, enable the processors to store received data in SLC pages, to divide equally a QLC block in a predefined number of sub-blocks according to a corresponding QLC page health status of the pages of the QLC block, and to copy device-internal the respective SLC pages to the sub-blocks of the QLC block using device-internal cache registers if it is determined that SLC pages are to be copied from SLC pages to QLC pages. Thereby, the copying may be based on an error-count aware scheme.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments to which the invention is not limited.

Figure 1:
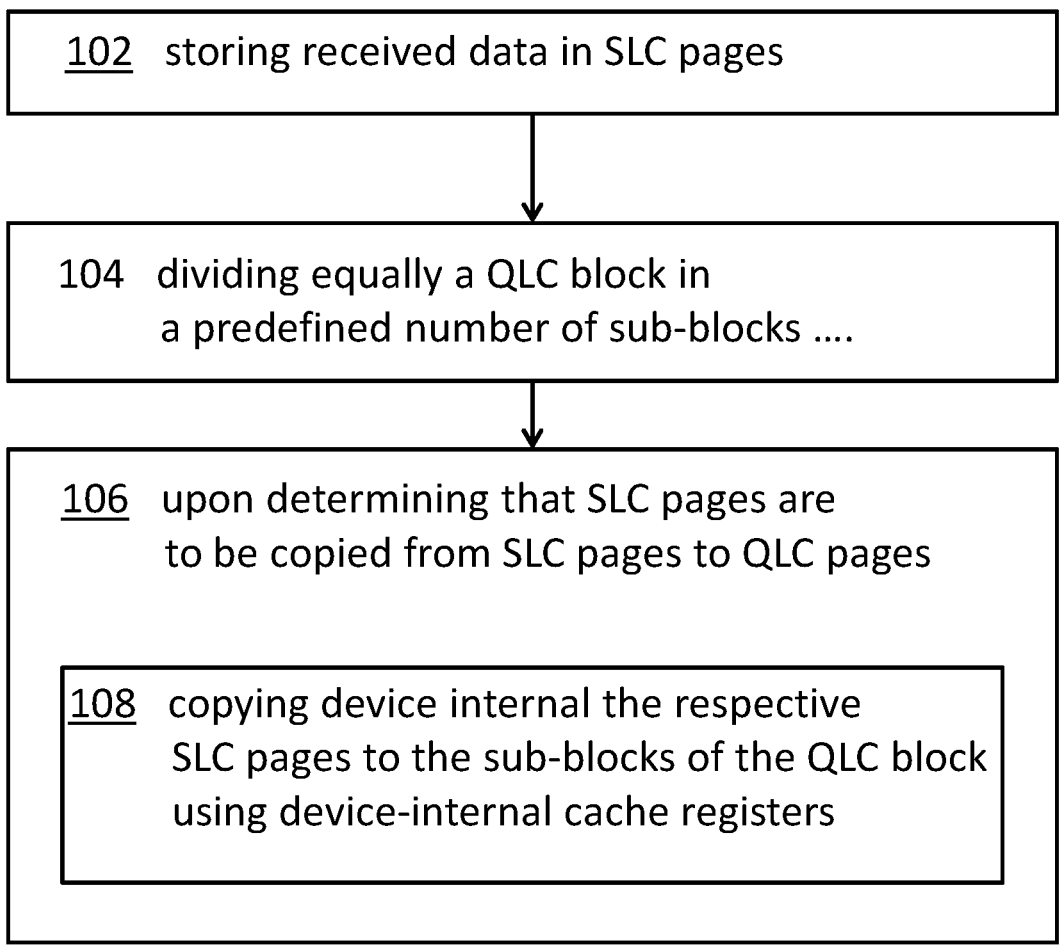

Preferred embodiments of the invention will be described, by way of example only, and with reference to the following drawings:

FIG. 1 shows a block diagram of an embodiment of the inventive computer-implemented method for writing data to pages in a QLC block of a QLC NAND flash memory device, where the device comprises a plurality of SLC pages organized in SLC blocks and a plurality of QLC pages organized in QLC blocks.

Figure 2:
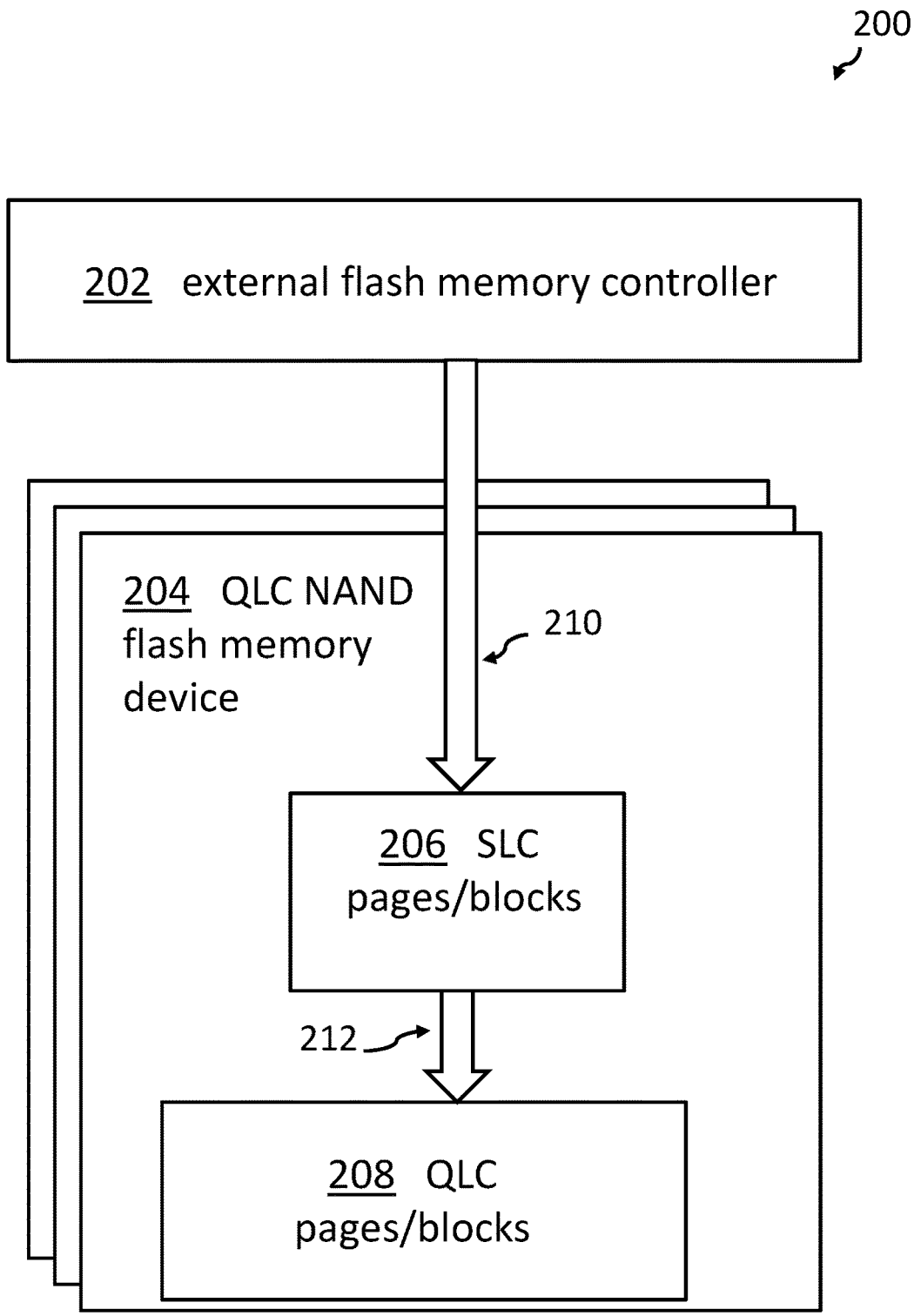

FIG. 2 shows a configuration of a QLC NAND flash memory device connected to an external flash memory controller.

Figure 3:
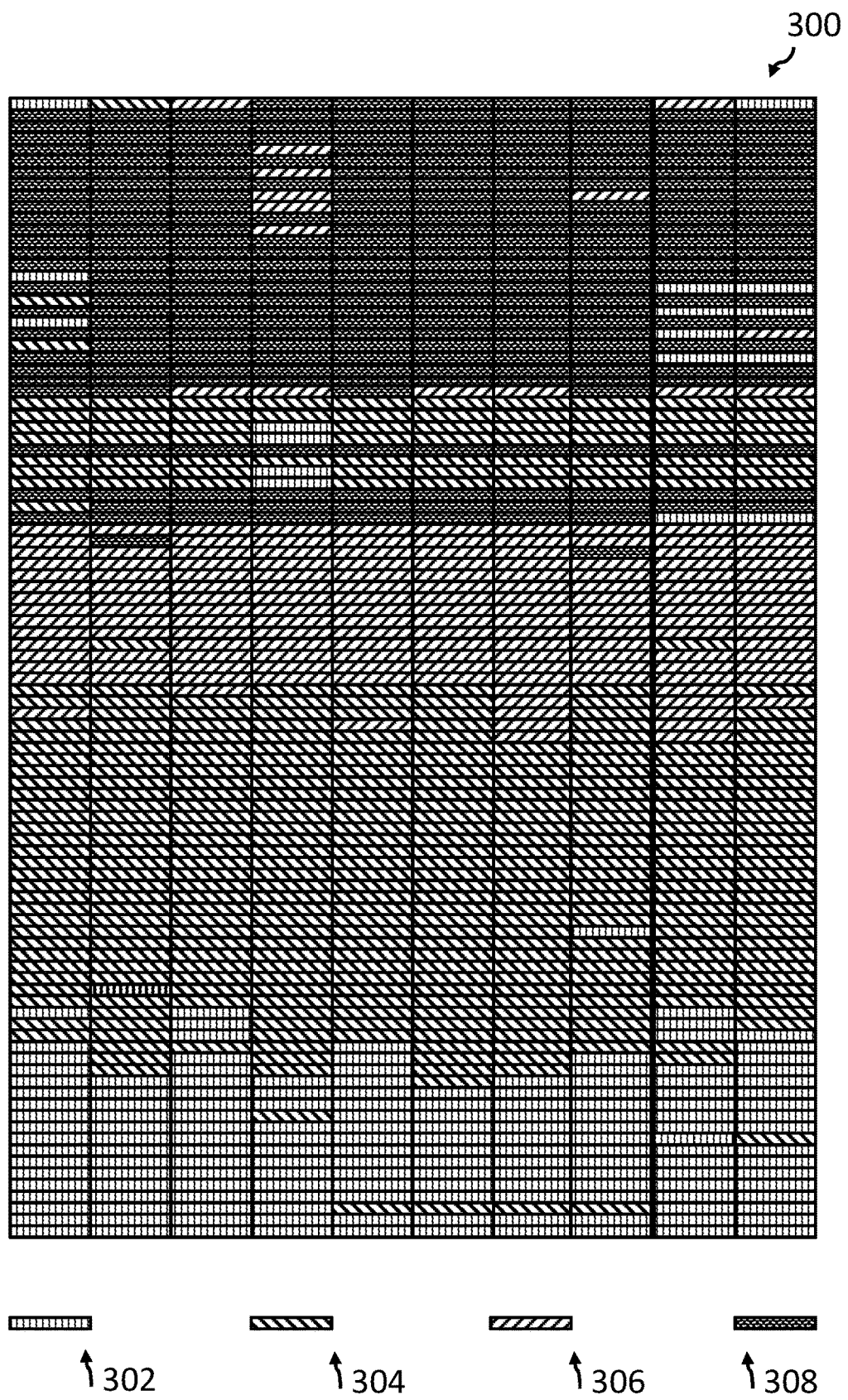

FIG. 3 shows an exemplary diagram of the NAND flash memory device comprising a plurality of pages.

Figure 4:
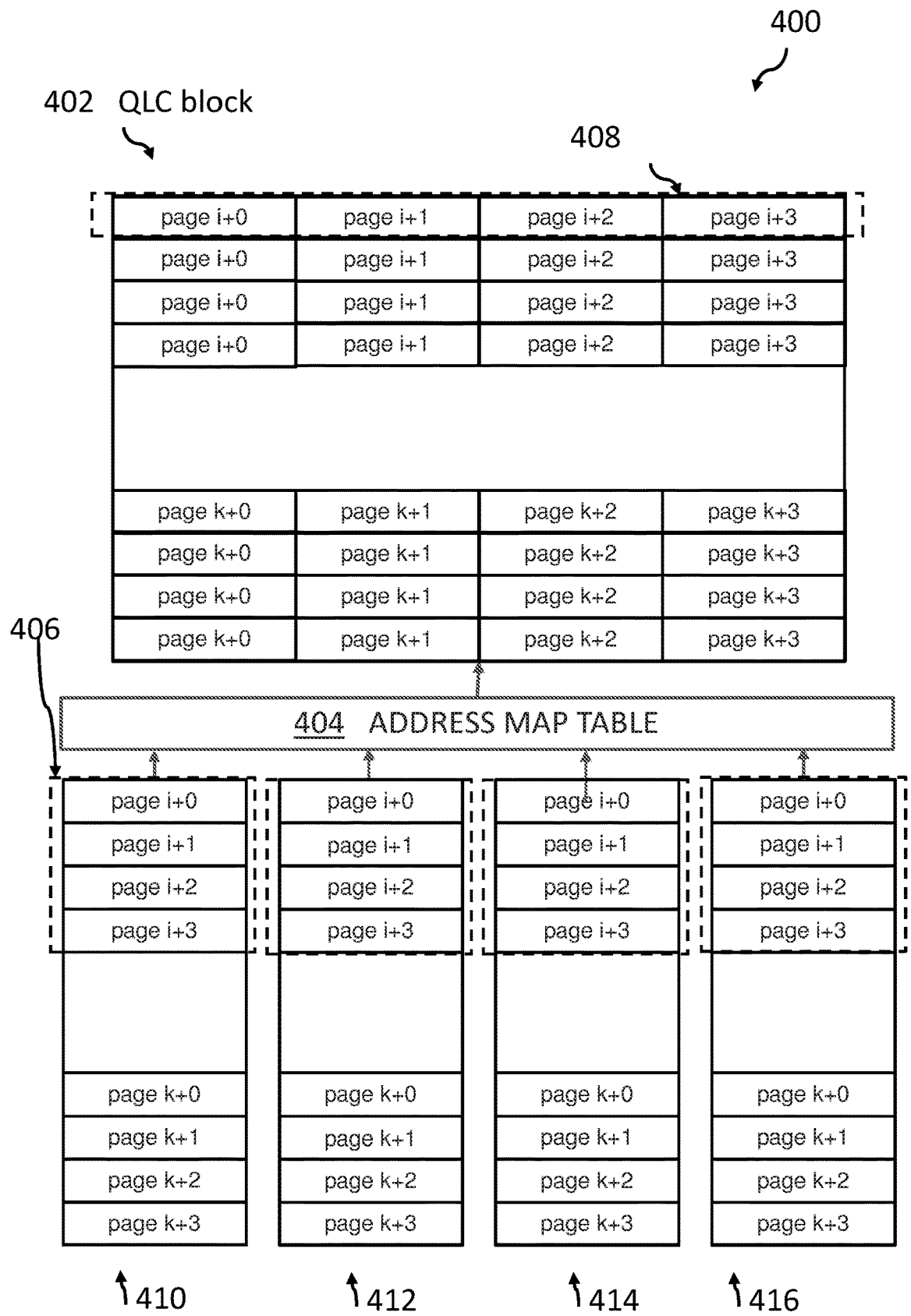

FIG. 4 shows a diagram how pages of the SLC blocks can be mapped to a QLC block using an address map table.

Figure 5:
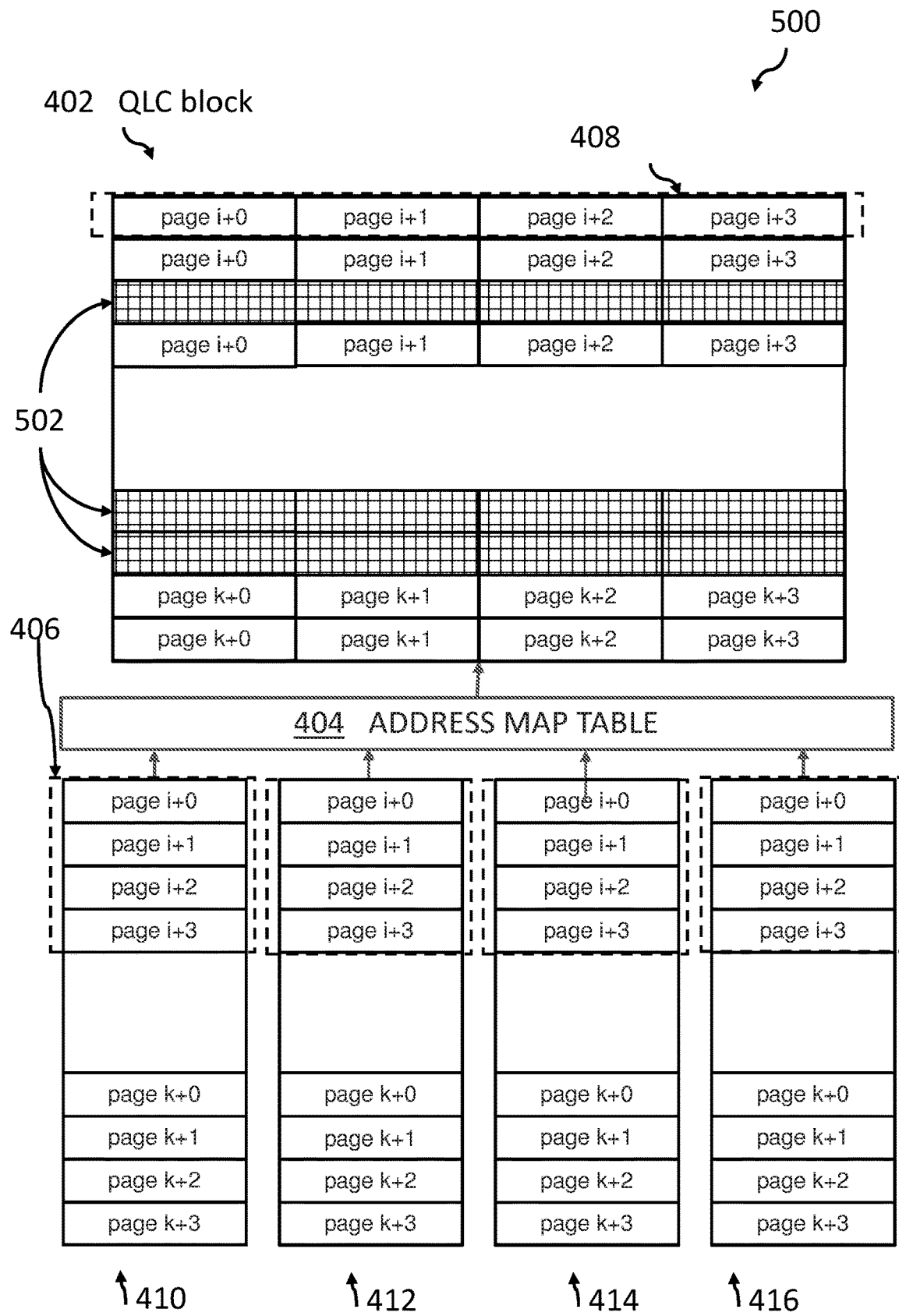

FIG. 5 shows a diagram with retired pages.

Figure 6:
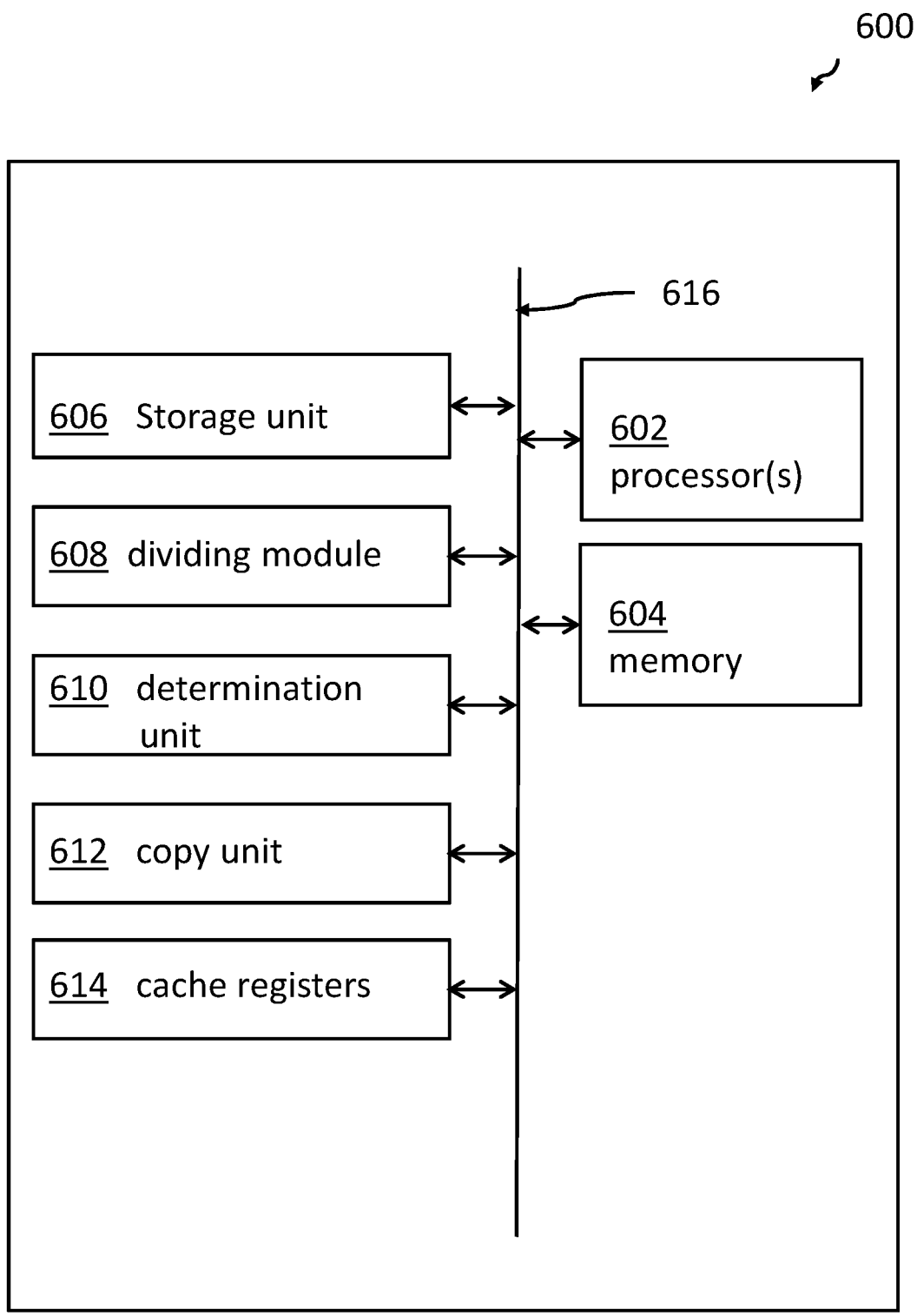

FIG. 6 shows a block diagram of an embodiment of the integrated QLC NAND flash memory system for writing data to pages in a QLC block of the QLC NAND flash memory device.

Figure 7:
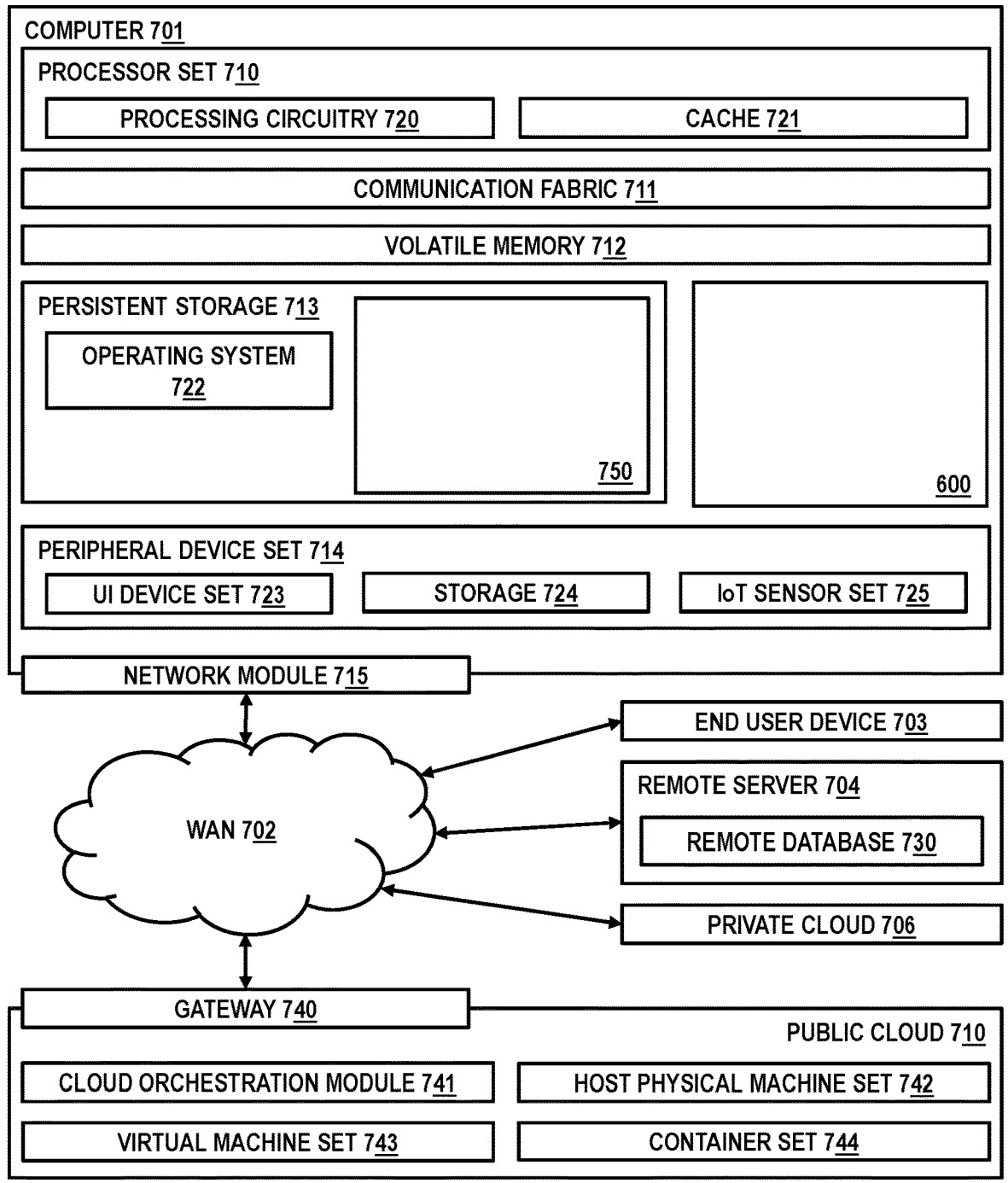

FIG. 7 shows an embodiment of a computing system comprising the system according to FIG. 6.

DETAILED DESCRIPTION

In the context of this description, the following technical conventions, terms and/or expressions may be used:

The term 'QLC NAND flash memory device' may denote here, e.g., a single chip comprising all memory cells and related drivers and addressing logic or an equivalent module comprising memory cells and surrounding logic components as a separate logic device. A plurality of such devices may be combined and controlled by an external controller comprising all mapping tables and address logic. A typical use case may be a solid-state disk (SSD), or similar. Generally, the device may be equipped with QLCs (quad-level memory cells). Each used QLC memory cells may be enabled to store 4 bits per physical memory device (as 16 different threshold-voltage values). The addressing of the pages may happen according to accessing a lower (L), an upper (U), an extra (X) or a top (T) page using one word line. It may also be noted that a QLC device comprises of QLC blocks that store four bits in each memory cell. The QLC blocks may be reconfigured to be used as SLC (single level cell) blocks being able to only store one bit in each memory cell. Thereby, the access to the data may be faster in SLC mode if compared to QLC mode.

The term 'page' or 'memory page' may denote a plurality of memory cells organized as a memory page, e.g., a NAND flash memory page. Typical memory page sizes are 2 kB, 4 kB 8 kB or 16 kB. The proposed concept may be applicable to any memory page size. Additionally, it may be mentioned that in typical NAND flash systems the minimum unit data which can be written may relate to a memory page, whereas a delete of data may typically be done per entire block of memory pages.

The term 'block' or 'memory block' or 'QLC block' may denote a plurality of memory pages, e.g., 2048 pages per block. Blocks may also be connected to related drivers, on-chip controller circuitry and other associated electronic circuits.

The term 'SLC block' may denote a block of memory cells comprising only SLCs.

The term 'QLC block' may denote a block of memory cells comprising only QLC cells organized as pages, i.e., L/U/X/T, compare above.

The term 'dividing equally' may denote that when dividing a QLC memory block in a predefined number—e.g., 4—of sub-blocks, each sub-block may comprise the same number of pages. The pages belonging to a single sub-block may comprise pages from all of the L/U/X/T pages. Thus, it is not required that a sub-block comprise only a plurality of one type of pages, e.g., being all top (T) pages.

The term 'sub-block' may denote a subset of the memory pages of a block. Thereby, typically all sub-blocks shall have the same size measured in number of pages. However, in alternative embodiments, also a variable size of pages per memory block may be used.

The term 'QLC page health status' may relate to an error count level of a respective QLC memory page. It is known that the flash memory pages within a block may show variations in their error count levels which can be attributed to process variations or the location of the corresponding memory cells in the memory array. Therefore, the different pages in the QLC block may have different health status.

The term 'device-internal cache register' may denote a set of intermediate storage registers usable to buffer data during the SLC-to-QLC copyback process. The data from the SLC block memory cells that are meant to be copied to the QLC block may comprise errors. These errors may be propagated to the QLC memory cells during the copyback process.

The term 'retiring'—in particular, retiring a sub-block—may denote not using a sub-block of a QLC block any longer because of a bad health status of the sub-block if compared to other sub-blocks of the QLC block. Retired blocks may be written with dummy data.

The proposed computer-implemented method for writing and retiring data to pages in a QLC block of a QLC NAND flash memory device, the device comprising a plurality of SLC pages organized in SLC blocks and a plurality of QLC pages organized in QLC blocks may offer multiple advantages, technical effects, contributions and/or improvements:

By using the proposed SLC to QLC write method using an error-count aware grouping of the QLC pages into sub-blocks and a metric-based mapping of the source SLC blocks to the destination QLC sub-blocks, the reliability of the QLC block is increased.

By using the proposed sub-block retirement method, the QLC blocks may be used longer, even if single pages may no longer be usable, i.e., being retired, thus increasing the lifetime of the QLC block with a reduced capacity, e.g. 75% of the pages are usable, which is preferable than the conventional methods that would retire the entire QLC block.

Another advantage may be in the device-agnostic character of the proposed method; i.e., no changes are required to the NAND flash memory devices. The method may be executed by a device-external controller or it may be implemented in hardware in the SSD flash controller.

Before describing the figures, additional embodiments of the inventive concept—applicable for the method as well as for the system—will be described.

According to an advantageous embodiment of the method, a determined health status for an SLC block may be selected out of the group comprising a highest raw bit error rate (RBER), a highest retention rate and a lowest write heat of the respective SLC pages to be copied. Indicators for a high RBER may be at least the following metrics: program/erase cycle count, retention time and read-disturb count.

According to another permissive embodiment of the method, the error-count aware scheme may comprise mapping an SLC block with a highest raw bit error rate to QLC pages that form a QLC sub-block which may exhibit a best raw bit error rate in the QLC block and copying the SLC block to the QLC sub-block using a device-internal copyback scheme. This may reduce the probability of increased errors in the QLC blocks due to the error propagation during a device-internal SLC to QLC copyback scheme. The embodiment may also comprise copying SLC blocks with a lowest raw bit error rate to QLC pages that exhibit a highest raw bit error rate in the QLC block.

This way to copy SLC blocks to QLC pages may differ from other data placement methods as (a) the data written from SLC to the QLCs comprise errors due to the device-internal copyback, and (b) the proposed data mapping happens within the target QLC blocks using the sub-block error-count aware scheme.

According to an alternative embodiment of the method, the error-count aware scheme may comprise copying SLC blocks with a (determined) highest write heat index value to QLC pages that exhibit the highest raw bit error rate in the QLC block—these pages are likely to be rewritten soon—and copying SLC blocks with a lowest write heat index value to QLC pages that exhibit the lowest raw bit error rate in the QLC block. The pages with the lowest write heat may be rewritten only occasionally (i.e., the related pages are likely to stay valid for a longer time) so that they would stay comparably long in the respective QLC memory cells, hence it is worthwhile using those QLC memory cells being able to store the respective data as long as possible, i.e., using the best QLC cells, pages or sub-blocks with the lowest RBER.

According to a further interesting embodiment, the method may also comprise retiring a first sub-block of a QLC block if a page of the sub-block hits a first error count threshold. Ideally, this would also be the sub-block having the 25% pages with highest RBER—i.e., SB4—according to a static address map, in case of 4 possible sub-blocks, where the QLC blocks is divided into four sub-blocks, i.e., SB1, SB2, SB3, SB4, where SB1<SB2<SB3<SB4 denotes that the pages in sub-blocks SB1 have lower RBER than the pages in sub-block SB2, the pages in sub-blocks SB2 have lower RBER than the pages in sub-block SB3, and the pages in sub-blocks SB3 have lower RBER than the pages in sub-block SB4. This way, the other sub-blocks may be used for a longer time so that not the complete memory block may become useless.

Hence and according to an interesting embodiment, the method may also comprise continuing using non-retired sub-blocks of the QLC block for copying data from SLC pages to a QLC block or QLC blocks and writing dummy data to the retired pages of the QLC block. Consequently, data are written to all QLC block pages during a write process to a QLC block and the normal page program order as specified by the device may be followed.

According to an advanced embodiment, the method may also comprise retiring a second sub-block of the QLC block if a page of the sub-block hits a second error count threshold value. Ideally, this would be sub-block SB3 defined above. In this case—during a write process—the retired pages are written with dummy data in order not to disturb a corresponding write schedule controlled by the external controller.

According to another enhanced embodiment, the method may also comprise converting the QLC block into SLC mode if a page in the (remaining) sub-blocks still in use hits a third error count threshold value. Ideally, this would be sub-block SB2 defined above. Hence instead of writing dummy data to 75% of the retired pages in the QLC block, it is beneficial to convert the block in SLC mode.

According to another useful embodiment, the method may also comprise continuing the error-count aware scheme when writing dummy data to the retired sub-blocks of the QLC block using SLC blocks with dummy data and the device-internal cache registers.

According to a permissive embodiment of the method, the copying SLC pages to a QLC block may comprise copying four pages from one SLC block to write one QLC set of shared pages—i.e., L/U/X/T pages—or copying four pages from four SLC blocks to write one QLC set of shared pages. Additionally, also other mapping mechanisms may be used.

In the following, a detailed description of the figures will be given. All instructions in the figures are schematic. Firstly, a block diagram of an embodiment of the inventive computer-implemented method for writing data to pages in a QLC block of a QLC NAND flash memory device, the device comprising a plurality of SLC pages organized in SLC blocks and a plurality of QLC pages organized in QLC blocks is given. Afterwards, further embodiments, as well as embodiments of the dynamic data adapter generator system for writing data to pages in a QLC block of a QLC NAND flash memory device, the device comprising a plurality of SLC pages organized in SLC blocks and a plurality of QLC pages organized in QLC blocks will be described.

FIG. 1 shows a block diagram of a preferred embodiment of the computer-implemented method 100 for writing data to pages in a QLC block of a QLC NAND flash memory device. Thereby, the device comprises a plurality of SLC pages organized in SLC blocks and a plurality of QLC pages organized in QLC blocks. The method 100 comprises storing, 102, received data from an external controller in SLC pages, and dividing equally, 104, a QLC block—typically all blocks—in a predefined number—typically 4 of sub-blocks—according to a corresponding QLC page health status of the pages of the QLC block. The dividing typically happens in the device-external flash/SSD controller.

The method 100 also comprises copying, 108, device-internal—i.e., without an involvement of buffers of the external controller—the respective SLC pages to the sub-blocks of the QLC block using device-internal cache registers—i.e., the pages are not copied back to the controller— where the copying is based on an error-count aware scheme. This copying happens if it is determined, 106, that SLC pages are to be copied from SLC pages to QLC pages. It may also be a useful feature to receive a respective command from the external controller or as part of the GC (garbage collection) for SLC pages, etc. Thereby, prior to the technical copying process, an SLC to QLC block mapping should be done which reflects the error-aware scheme.

In other words: In general, the dividing 104 has taken place in the controller in advance. Then, as part of the regular operation of the flash memory device, the controller stores, 102, the data in SLC blocks of the flash memory device. At a certain point in time, the external controller decides to copy, 106, the data from 4 SLC blocks to a QLC block using internal copyback process. For this, the controller sends a series of copyback commands with the SLC pages as source addresses and the QLC pages as destination addresses, where the selection of the SLC source addresses and QLC destination addresses is based (a) on the QLC sub-block error count aware page grouping (namely according to the QLC page health) and (b) the metric used to map the SLC blocks and the QLC sub-blocks (for example the write heat: write hot SLC data go to higher RBER QLC pages)

FIG. 2 shows a configuration 200 of a QLC NAND flash memory device 204 connected to an external flash memory controller 202. A plurality of the QLC NAND flash memory devices 204 can be connected to the external flash memory controller 202, as indicated.

The write scheme for this architecture is as follows: host data received by the external flash memory controller 202 are firstly written, 210, by the external flash memory controller 202 to SLC blocks 206. It should also be noted that reading data from SLC blocks 206 is faster than reading data from the QLC blocks 208.

If required—e.g., if no more SLC blocks 206 are free to be written—data are moved from SLC blocks 206 to QLC blocks 208 using an on-chip copy back operation. During this operation the data from the SLC blocks are not transferred back to the external flash memory controller 202 and then re-written directly to the QLC blocks 208 by the external flash memory controller 202. Instead, an internal intermediate buffer (not shown) of the QLC NAND flash memory device 204 is used to read and store the data from the source SLC pages/blocks 206 and copy the data back to the target QLC pages/blocks 208.

When the blocks in SLC mode are exhausted, firstly a garbage collection (GC) operation cleans the blocks. It should be understood that the NAND flash memory devices only allow to write complete blocks and not individual bits or bites. During this process, some of the SLC data blocks are evicted, 212, to QLC blocks; the rest is relocated internally inside the SLC tier. During QLC GC, the data are firstly written to the SLC tier—via the external controller— and then the data are copied back to QLC blocks.

The newly proposed concept allows also a QLC sub-block retirement. As a block ages and thus the raw block error rate (RBER) of the pages of the block increases above the ECC correction capability, the controller decides to retire part of the block, e.g., the worst 25% of pages of a block. User data are then placed to the non-retired portions of the block and dummy data are written to the retired part in order to preserve the device page program order.

The sub-block retirement makes sense because it appears that the page characteristics typically differ significantly within a QLC block. Pages in specific locations may exhibit much higher errors while the remaining pages of the block show quite low error count levels. This may be contributed to layout stacking processes, different device parameters per page location, etc. The conglomeration of areas of pages and blocks with page faults can easily be identified with page fault heat maps.

Typically, and according to traditional approaches, when a page exceeds an error count threshold value, the flash memory management of the external flash memory controller 202 retires the entire related block. However, by retiring only a smaller subset of the pages (e.g., in steps of 25%), the controller can extend the lifetime of the block for more p/e (program/erase) cycles with a respective reduced capacity.

FIG. 3 shows an exemplary block 300 of a NAND flash memory device comprising a plurality of pages, each shown as a narrow rectangle filled differently. The X axis relates to the time, while the Y axis relates to the pages (or word-lines) in the block. Hence, the complete set of pages of the block is shown for 10 different points in time. It turns out that the pages of the block may easily be separated equally into sub-blocks of 25% of the pages each. Exemplary, at each point in time, pages shown with the pattern 302 may represent the 25% worst pages, the next 25% of the pages are shown with the pattern 304, then 306 and finally the best pages with pattern 308. "Best pages" refers here to pages with a best health status or with the lowest RBER.

Although, some of the pages show a different pattern at different points in time, it can be appreciated that the variations are small. This is because, at each point in time, the patterns 302, 304, 306, 308 represent the relative health of the pages in the block and not the absolute error count levels. Although the latter can change over time, the relative health status of the pages remains very similar. Therefore, it is possible to define a single error-count grouping of the pages into 4 sub-blocks that can be used for all points in time, or a set of error-count groupings of the pages into 4 sub-blocks that can be used depending on the usage conditions of the QLC blocks, e.g., light vs. moderate vs. heavy p/e cycled QLC blocks.

Based on this insight, writing data from SLC blocks to a QLC block using (a) copyback/program (i.e., write) commands, and (b) an error-counter where grouping of the QLC block page addresses becomes possible.

The QLC block address grouping is further used to retire subsets of the L/U/X/T pages and thus, to extend the block lifetime for more p/e cycles with an effective reduced capacity.

Thereby, the error-aware QLC block address grouping is based on the error count analysis to divide a QLC block into four groups, i.e., sub-blocks (SB), each comprising ¼ of the total pages of the block, where SB4 has the pages with the highest error count (i.e., SB4>SB3>SB2>SB1). This mechanism can work in parallel to a static grouping of blocks which may be determined based on the characterization, e.g., also an error-count aware method based on the page index.

FIG. 4 shows a diagram 400 of how pages of the SLC blocks 410, 412, 414, 416 can be mapped to a QLC block 402 using the address map table 404. This is one of many examples of the mapping from SLC blocks to QLC blocks. Here, four pages from one SLC block 406 are copied or written to one QLC set 408 (L/U/X/T) of shared pages.

Alternatively, it is also possible to combine four pages from four SLC blocks to write one QLC set of shared pages. The pages written to the QLC block must always follow the device program order. Additionally, the SLC pages read from the SLC blocks may be consecutive or selected based on a predefined address map. Furthermore, if read multiplane commands are used, further restrictions may apply (e.g., the pages read from the multiple planes have the same page address, etc.)

FIG. 5 shows a diagram 500 with retired pages 502, as discussed above. A static address map of QLC pages to retire may be used for all blocks (typically, the map comprises sets of shared L/U/X/T pages to retire).

The L/U/X/T pages can be ranked from lowest to highest RBER based on the characterization; and the number of the worst pages (e.g., 25% of the overall block) is then retired when the RBER increases above a (first) threshold. Thereby, retired pages must be written with dummy data to preserve the device page program order and to comply with block reliability requirements.

In this context—but without an extra figure—the error-count aware SLC to QLC data placement should be described: the SLC data are written—on requirement—to QLC blocks according to the SLC block error count (or block state information, such as retention, p/e cycles of read disturb count, etc.). Thereby,
 (i) SLC blocks with higher RBER are written to QLC pages that exhibit the best RBER in the respective QLC block; and
 (ii) SLC blocks with the lowest RBER are written to QLC pages that exhibit the worst RBER in the respective QLC block.

This has clear benefits: It reduces the probability of increased errors in QLC blocks due to the error propagation during the SLC-to-QLC copyback device-internal scheme.

This method is also different from other data placement methods as (a) the data written from the SLC blocks to the QLC block contain errors and (b) the proposed data mapping and placement happens within the target QLC blocks using the sub-block error-count aware scheme. In general, one can divide the pages of the SLC blocks a 410, 412, 414, 416 into four groups according to their error count and then map them to the four (equally divided) sub-blocks in the QLC target block.

In the alternative data placement scheme the SLC-to-QLC data placement is based on the SLC data write heat. Thereby, the more often a page is written, the "hotter" the page is characterized.

According to this placement scheme, SLC data having a high write heat are written to QLC pages that exhibit the higher RBER in the respective QLC block. The data with the highest write heat are likely to be rewritten soon. Thus, they have an expected short lifespan. Because these pages are likely to be rewritten soon, they would be invalidated in the QLC block soon enough before the RBER of the corresponding QLC page starts to approach or exceed the ECC strength.

The quantity of SLC data showing a cold write status—i.e., data that do not change a lot over time—are written to QLC pages exhibiting the lowest RBER in the respective QLC blocks. These pages are likely to stay valid for longer time (because of the low write heat), so it is preferred to be placed in the QLC pages that show the lowest RBER under long retention periods.

In addition to the SLC-to-QLC block write schemes, also the progressive sub-block retirement should be described here: as a prerequisite, pages of the QLC blocks have to be separated equally into sub-blocks, e.g., according to the RBER count. When the highest error count in the block hits the first error count threshold value, then the (external) controller decides to retire, sub-block SB4. Ideally, the page with the highest error count in the block belongs to the sub-block with worst 25% of the L/U/X/T pages according to the static address map.

The controller continues to use the block while writing user data to the remaining 75% of the block and dummy data to the retired pages of the block.

When the highest error count in the remaining block hits a second error count threshold value, then the (external) controller decides to retire sub-block SB3; also here ideally the page with the highest error count in the remaining block belongs to the sub-block with the second worst 25% of L/U/X/T pages according to the static address map.

Again, the controller continues to use the block by writing user data to the remaining 50% of the block and dummy data to the retired pages.

When the highest error count in the remaining block hits a third error count threshold value, then the (external) controller decides to convert the QLC block into a block in SLC mode. Ideally, the page with the highest error count in the remaining block belongs to the sub-block with the worst 25% of L/U/X/T pages according to the static address map.

Advantageously, during the progressive sub-block retirement, the error-count aware SLC-to-QLC block data placement continues to be applied to the valid (non-retired) pages of the block of the NAND flash memory device.

It should also be mentioned that not a strict 25%/25%/25%/25% sub-block division is required. The blocks may also be divided unequally in pages (e.g., with a percentage of a-b-c-d where a+b+c+d=100%) or in more than four groups. This gives even more design freedom for the applied controller design. In this first case, a % of the data from the 4 SLC blocks are mapped to the first QLC sub-block, b % of the data from the 4 SLC blocks are mapped to the second QLC sub-block, c % of the data from the 4 SLC blocks are mapped to the third sub-block, and d % of the data from the 4 SLC blocks are mapped to the fourth sub-block. In the latter case, the data from 4 SLC blocks are divided into so many sub-groups as the number of QLC sub-blocks.

FIG. 6 shows a block diagram of an embodiment of the dynamic data adapter generator system 600 for writing data to pages in a QLC block of a QLC NAND flash memory device. Thereby, the device comprises a plurality of SLC pages organized in SLC blocks and a plurality of QLC pages organized in QLC blocks. The system comprises one or more processors 602 and a memory 604 operatively coupled to the one or more processors 602, wherein the memory 604 stores program code portions which, when executed by the one or more processors 602, enable the one or more processors to store received data in SLC pages—in particular, by a program unit 606—to divide equally—in particular, by a dividing module 608—a QLC block in a predefined number of sub-blocks according to a corresponding QLC page health status of the pages of the QLC block, and to copy—in particular using a copy unit 612—device-internal the respective SLC pages to the sub-blocks of the QLC block using device-internal cache registers 614 if it is determined—in particular, using a determination unit 610—that SLC pages are to be copied from SLC pages to QLC pages. Thereby, the copying is based on an error-count aware scheme.

It shall also be mentioned that all functional units, modules and functional blocks—in particular, the one or more processors 602, the memory 604, the storage unit 606, the dividing module 608, the determination unit 610, the copying unit 612 and the cash registers 614—may be communicatively coupled to each other for signal or message exchange in a selected 1:1 manner. Alternatively, the functional units, modules and functional blocks can be linked to a system internal bus system 616 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 7 shows a computing environment 700 comprising an example of an environment for the execution of at least some of the computer code involved in performing the inventive methods, such as the computer-implemented method for writing data to pages in a QLC block of a QLC NAND flash memory device, the device comprising a plurality of SLC pages organized in SLC blocks and a plurality of QLC pages organized in QLC blocks, 750.

In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (e.g., embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments.

Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

It should also be mentioned that the dynamic data adapter generator system for writing data to pages in a QLC block of a QLC NAND flash memory device the device comprising a plurality of SLC pages organized in SLC blocks and a plurality of QLC pages organized in QLC blocks can be an operational sub-system of the computer 701 and may be attached to a computer-internal bus system.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for writing data to pages in a QLC block of a QLC NAND flash memory device, said device comprising a plurality of SLC pages organized in SLC blocks and a plurality of QLC pages organized in QLC blocks, said method comprising:
   storing received data in SLC pages,
   dividing equally a QLC block in a predefined number of sub-blocks according to a corresponding QLC page health status of said pages of said QLC block, and
   upon determining that SLC pages are to be copied from SLC pages to QLC pages; copying device-internal said respective SLC pages to said sub-blocks of said QLC block using device-internal cache registers, wherein said copying is based on an error-count aware scheme.

2. The method according to claim 1, wherein a determined health status for an SLC block is selected out of said group comprising a highest raw bit error rate, a highest retention rate and a lowest write heat of said respective SLC pages to be copied.

3. The method according to claim 1, wherein said error-count aware scheme comprises;
   mapping an SLC block with a highest raw bit error rate to QLC pages that form a QLC sub-block which exhibits a lowest raw bit error rate in said QLC block, and
   copying said SLC block to said QLC sub-block using a device-internal copyback scheme.

4. The method according to claim 1, wherein said error-count aware scheme comprises;
   copying SLC blocks with a highest write heat index value to QLC pages that exhibit a highest raw bit error rate in said QLC block, and
   copying SLC blocks with a lowest write heat index value to QLC pages that exhibit a lowest raw bit error rate in said QLC block.

5. The method according to claim 1, also comprising:
   retiring a first sub-block of a QLC block if a page of said respective sub-block hits a first error count threshold value.

6. The method according to claim 5, also comprising:
   continuing using non-retired sub-blocks of said QLC block for copying data from SLC pages QLC block, and
   writing dummy data to said retired page of said respective QLC block.

7. The method according to claim 5, also comprising:
   retiring a second sub-block of said QLC block if a page of said sub-block hits a second error count threshold value.

8. The method according to claim 7, also comprising:
   converting said QLC block into SLC mode if a page in said sub-block still in use hits a third error count threshold value.

9. The method according to claim 5, also comprising:
   continuing said error-count aware scheme when copying said respective SLC pages to said sub-blocks of said QLC block using device-internal cache registers.

10. The method according to claim 1, wherein said copying SLC pages to a QLC block comprises;
    copying four pages from one SLC block to write one QLC set of shared pages, or
    copying four pages from four SLC blocks to write one QLC set of shared pages.

11. An integrated QLC NAND flash memory system for writing data to pages in a QLC block of said QLC NAND flash memory device, said device comprising a plurality of SLC pages organized in SLC blocks and a plurality of QLC pages organized in QLC blocks, said system comprising:
 one or more processors and a memory operatively coupled to said one or more processors, wherein said memory stores program code portions which, when executed by said one or more processors, enable said one or more processors to;
 store received data in SLC pages,
 divide equally a QLC block in a predefined number of sub-blocks according to a corresponding QLC page health status of said pages of said QLC block, and
 upon determining that SLC pages are to be copied from SLC pages to QLC pages; copy device-internal said respective SLC pages to said sub-blocks of
 said QLC block using device-internal cache registers, wherein said copying is based on an error-count aware scheme.

12. The system according to claim 11, wherein a determined health status for an SLC block is selected out of said group comprising a highest raw bit error rate, a highest retention rate and a lowest write heat of said respective SLC pages to be copied.

13. The system according to claim 11, wherein said one or more processors executing said error-count aware scheme is also enabled to; map an SLC block with a highest raw bit error rate to QLC pages that form a QLC sub-block which exhibits a lowest raw bit error rate in said QLC block, and copy said SLC block to said QLC sub-block using a device-internal copyback scheme.

14. The system according to claim 11, wherein said one or more processors executing said error-count aware scheme is also enabled to;
 copy SLC blocks with a highest write heat index value to QLC pages that exhibit a worst raw bit error rate in said QLC block, and
 copy SLC blocks with a lowest write heat index value to QLC pages that exhibit a best raw bit error rate in said QLC block.

15. The system according to claim 11, wherein one or more processors is also enabled to
 retire a first sub-block of a QLC block if a page of said sub-block hits a first error count threshold value.

16. The system according to claim 15, wherein said one or more processors are also enabled to;
 continue using non-retired sub-blocks of said QLC block for copying data from SLC pages QLC block, and
 write dummy data to said retired page of said QLC block.

17. The system according to claim 15, wherein said one or more processors are also enabled to;
 retire a second sub-block of said QLC block if a page of said sub-block hits a second error count threshold value.

18. The system according to claim 17, wherein said one or more processors are also enabled to;
 convert said QLC block into SLC mode if a page in said sub-block still in use hits a third error count threshold value.

19. The system according to claim 15, wherein said one or more processors are also enabled to;
 continue said error-count aware scheme when copying said respective SLC pages to said sub-blocks of said QLC block using device-internal cache registers.

20. A computer program product for writing data to pages in a QLC block of said QLC NAND flash memory device, said device comprising a plurality of SLC pages organized in SLC blocks and a plurality of QLC pages organized in QLC blocks, said computer program product comprising a computer readable storage medium having program instructions embodied therewith, said program instructions being executable by one or more computing systems or controllers to cause said one or more computing systems to:
 store received data in SLC pages,
 divide equally a QLC block in a predefined number of sub-blocks according to a corresponding QLC page health status of said pages of said QLC block, and
 upon determining that SLC pages are to be copied from SLC pages to QLC pages copy device-internal said respective SLC pages to said sub-blocks of
 said QLC block using device-internal cache registers, wherein said copying is based on an error-count aware scheme.

* * * * *